(12) United States Patent
Hamakita

(10) Patent No.: US 9,689,464 B2
(45) Date of Patent: Jun. 27, 2017

(54) WORM SPEED REDUCER AND METHOD FOR MANUFACTURING WORM WHEEL INCLUDED IN WORM SPEED REDUCER

(71) Applicant: JTEKT CORPORATION, Osaka-shi, Osaka (JP)

(72) Inventor: Jun Hamakita, Kashihara (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/736,989

(22) Filed: Jun. 11, 2015

(65) Prior Publication Data
US 2015/0377322 A1    Dec. 31, 2015

(30) Foreign Application Priority Data
Jun. 30, 2014    (JP) .................. 2014-134840

(51) Int. Cl.
| | | |
|---|---|---|
| *F16H 1/16* | (2006.01) | |
| *F16H 55/02* | (2006.01) | |
| *F16H 55/22* | (2006.01) | |
| *B23F 11/00* | (2006.01) | |
| *F16H 55/24* | (2006.01) | |

(52) U.S. Cl.
CPC ............. *F16H 1/16* (2013.01); *B23F 11/00* (2013.01); *F16H 55/22* (2013.01); *F16H 55/24* (2013.01)

(58) Field of Classification Search
CPC ........ F16H 1/16; F16H 3/06; F16H 2025/209; F16H 55/02; F16H 55/22; B23F 11/00
USPC .... 74/89.14, 724, 425, 458; 29/893, 893.31, 29/893.35
See application file for complete search history.

(56) References Cited

U.S. PATENT DOCUMENTS

| | | | | | |
|---|---|---|---|---|---|
| 2,897,634 | A * | 8/1959 | Wildhaber | ................ | B23F 1/02 125/11.06 |
| 2,935,886 | A * | 5/1960 | Wildhaber | .............. | B23F 11/00 29/893.31 |
| 3,785,244 | A * | 1/1974 | Wildhaber | .............. | B23F 11/00 409/12 |
| 6,736,557 | B2 * | 5/2004 | DeVore | ................ | B41J 25/3088 400/354 |
| 7,654,167 | B2 * | 2/2010 | Watanabe | ............ | B62D 5/0409 74/388 PS |
| 8,360,196 | B2 * | 1/2013 | Suzuki | ................ | B29C 45/0055 180/444 |
| 2002/0078776 | A1 * | 6/2002 | Yamashita | ............ | B29C 33/005 74/425 |

FOREIGN PATENT DOCUMENTS

JP    2006-103395 A    4/2006

* cited by examiner

*Primary Examiner* — William Kelleher
*Assistant Examiner* — Bobby Rushing, Jr.
(74) *Attorney, Agent, or Firm* — Oliff PLC

(57) ABSTRACT

A plane that contains a central axis of a worm shaft and that is orthogonal to a central axis of a worm wheel is arranged at a central position of the worm wheel in a tooth width direction thereof when no load is applied to a worm speed reducer. The worm wheel is formed by a cutting operation using a hob with a hob center offset from the central position toward an offset direction corresponding to a first direction along the tooth width direction. A pair of tooth flanks has different pressure angles at the central portion in the tooth width direction.

6 Claims, 8 Drawing Sheets

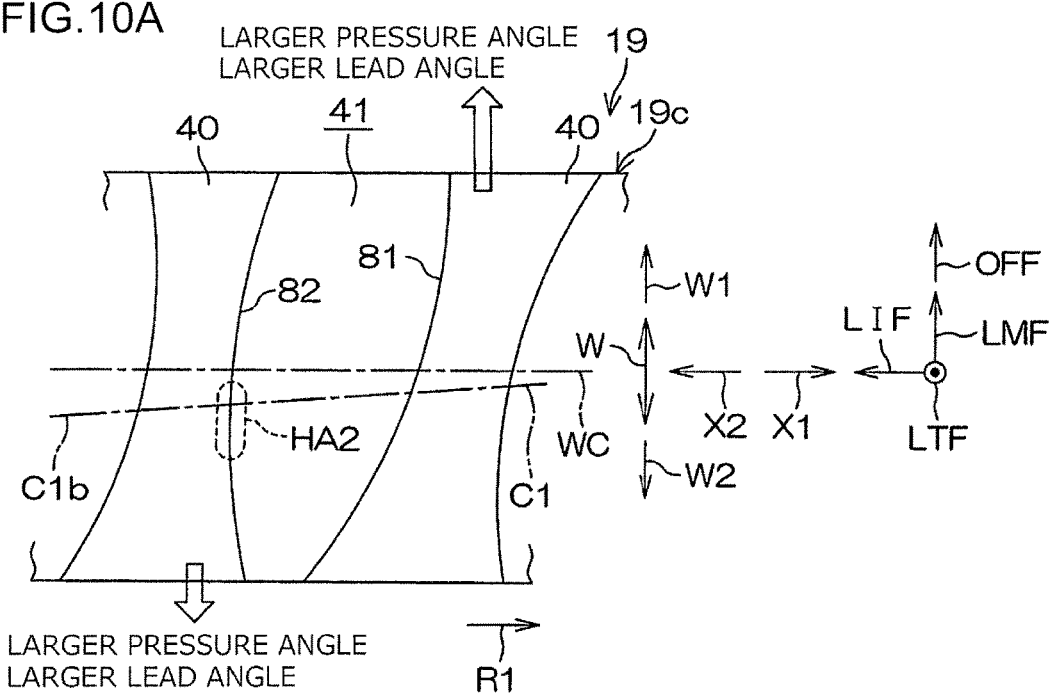
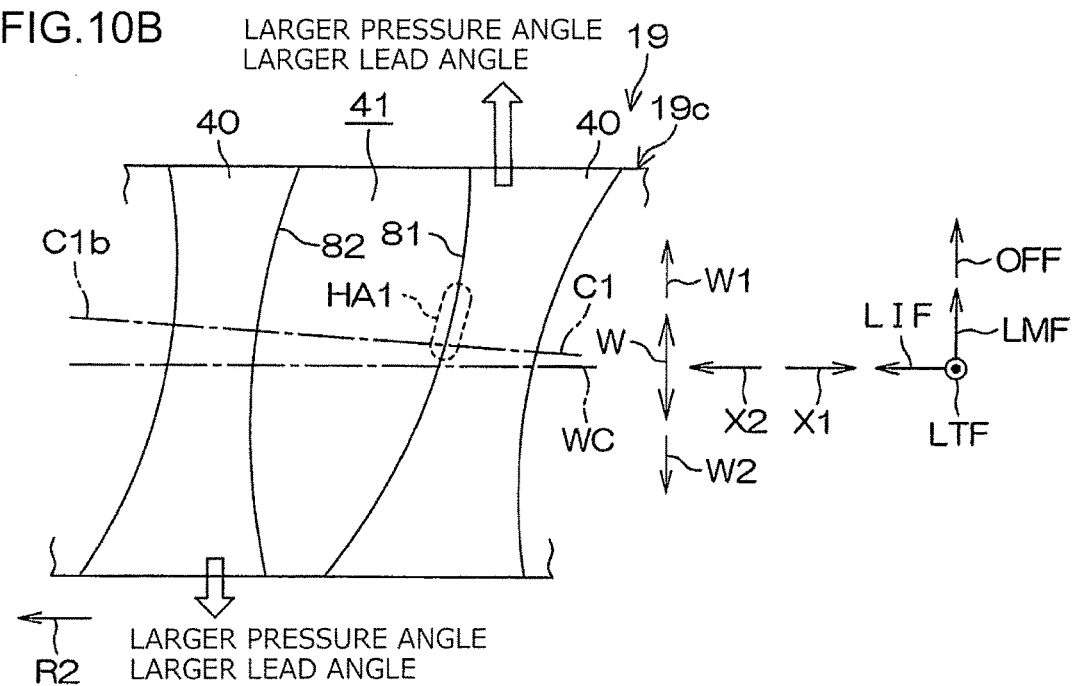

WORM SPEED REDUCER AND METHOD FOR MANUFACTURING WORM WHEEL INCLUDED IN WORM SPEED REDUCER

INCORPORATION BY REFERENCE

The disclosure of Japanese Patent Application No. 2014-134840 filed on Jun. 30, 2014 including the specification, drawings and abstract, is incorporated herein by reference in its entirety.

BACKGROUND OF THE INVENTION

1. Field of the Invention

The present invention relates to a worm speed reducer and a method for manufacturing a worm wheel included in the worm speed reducer.

2. Description of Related Art

In an electric power steering system, rotation output from an electric motor is transmitted to a worm shaft in a worm speed reducer. The rotation output from the electric motor is decelerated via a worm wheel that meshes with the worm shaft, and the resultant rotation is transmitted to a turning mechanism. Thus, a steering operation undergoes torque assistance. The meshing between the worm shaft and the worm wheel needs backlash. However, during traveling, tooth hitting sound (rattle sound) may occur due to the backlash.

Consequently, an electric power steering system has been proposed in which the worm shaft is supported such that a first end thereof pivots around a second end thereof, with the second end elastically biased by a bias member toward the worm wheel side, thus eliminating the backlash. However, only when the worm wheel rotates in a first rotating direction, a meshing reaction force (driving reaction force) that the worm shaft receives from the worm wheel at a meshing portion of the worm shaft results in a moment that biases the meshing portion of the worm shaft toward the worm wheel side (that is, in the direction in which the first end is biased by the bias member) around the second end.

Therefore, meshing frictional resistance resulting from rotation of the worm wheel in the first rotating direction is larger than meshing frictional resistance resulting from rotation of the worm wheel in a second rotating direction that is an opposite direction of the first rotating direction. Thus, frictional resistance torque in the former case is higher than frictional resistance torque in the latter case. As a result, steering feeling may vary according to a steering direction.

On the other hand, two techniques for an electric power steering system have been proposed; one of the techniques involves varying a pressure angle between tooth flanks forming a pair of tooth flanks of the worm shaft, and the other involves varying the pressure angle between opposite tooth flanks of the worm wheel in the rotating direction (see, for example, paragraph [0041] and FIG. 5 of Japanese Patent Application Publication No. 2006-103395 (JP 2006-103395 A)). JP 2006-103395 A is expected to be effective for suppressing the difference in frictional resistance torque due to a difference in rotating direction.

However, for the worm shaft and the worm wheel, a cutting tool with a special shape is needed to vary the pressure angle between the tooth flanks. That is, a plurality of cutting tools is needed in which the cutting tools have different shapes corresponding to different specifications for the worm shaft or the worm wheel. This leads to high overall manufacturing costs.

SUMMARY OF THE INVENTION

An object of the present invention is to provide an inexpensive worm speed reducer that enables suppression of a difference in frictional resistance torque due to a difference in rotating direction and a method for manufacturing a worm wheel included in the worm speed reducer.

Constitutional features of a worm speed reducer in an aspect of the present invention are as follows. The worm speed reducer includes a worm shaft with a first end coupled to an electric motor so as to be driven by the electric motor and a second end on the opposite side of the worm shaft in its axial direction from the first end, a worm wheel with pairs of tooth flanks, each pair defining a tooth space, a housing that houses the worm shaft and the worm wheel and that supports the second end of the worm shaft so as to enable the second end to pivot around the first end, and a bias member supported by the housing to elastically bias the second end of the worm shaft toward the worm wheel side. A plane that contains a central axis of the worm shaft and that is orthogonal to the central axis of the worm wheel is arranged at a central position of the worm wheel in a tooth width direction thereof. The worm wheel is formed by a cutting operation using a hob with a hob center offset from the central position in the tooth width direction, in an offset direction corresponding to a first direction along the tooth width direction. The tooth flanks of each pair have different pressure angles at the central position in the tooth width direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10A and FIG. 10B are enlarged views of the tooth portion of the worm wheel, corresponding to diagrams illustrating that a tooth contact area varies depending on the rotating direction of the worm wheel.

DETAILED DESCRIPTION OF EMBODIMENTS

Figure 1:
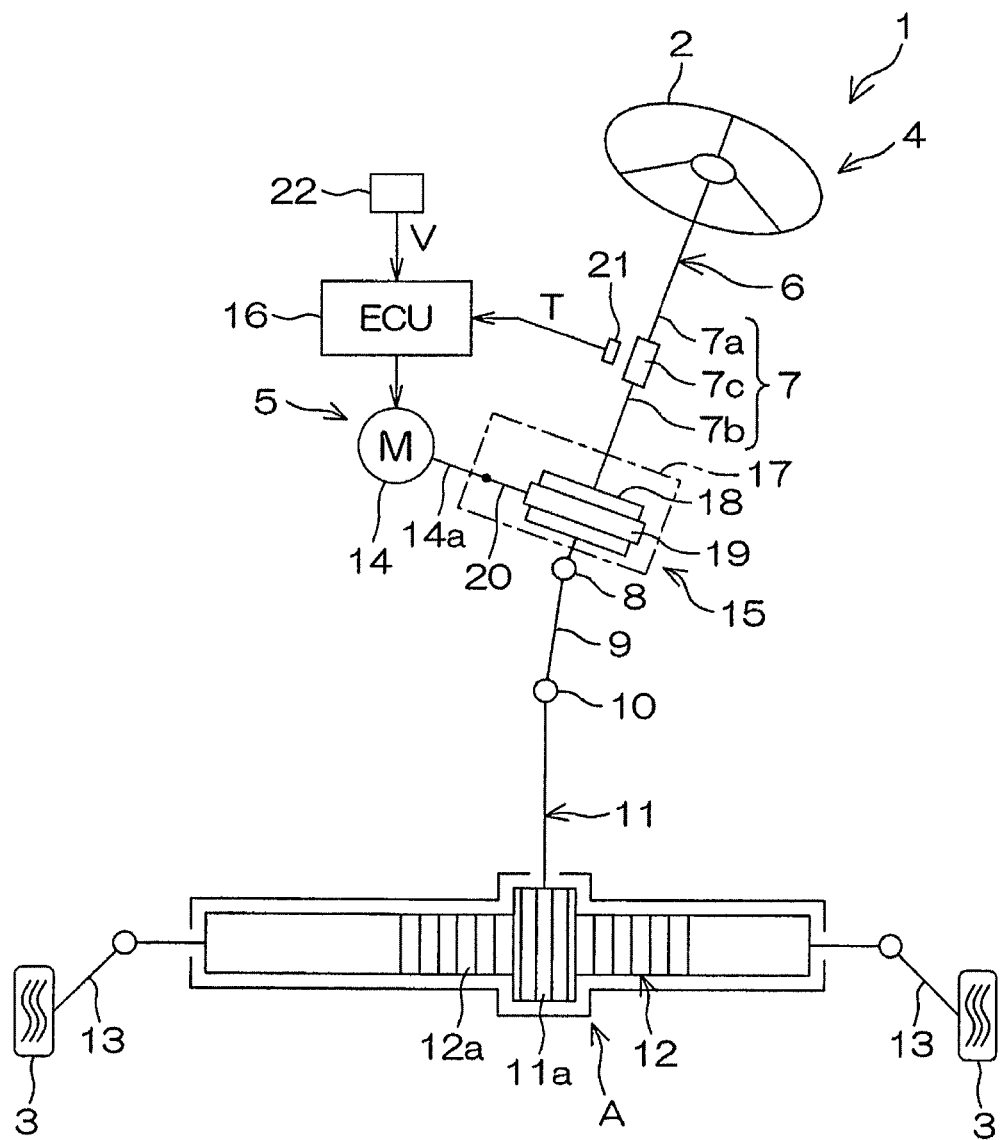
FIG. 1 is a schematic diagram of an electric power steering system to which a worm speed reducer according to an embodiment of the present invention is applied.

An embodiment of the present invention will be described below in accordance with the drawings. FIG. 1 is a schematic diagram depicting a general configuration of an electric power steering system including a worm speed reducer according to an embodiment of the present invention. As depicted in FIG. 1, an electric power steering system 1 includes a steering mechanism 4 and an assist mechanism 5. The steering mechanism 4 turns turning wheels 3 based on a driver's operation of a steering wheel 2 (steering member). The assist mechanism 5 assists the driver's steering operation.

The steering mechanism 4 includes a steering shaft 6 that serves as a rotating shaft of the steering wheel 2. The steering shaft 6 includes a column shaft 7, an intermediate shaft 9, and a pinion shaft 11. The column shaft 7 is coupled to a center of the steering wheel 2. The intermediate shaft 9 is coupled to one end (axially lower end) of the column shaft 7 via a universal joint 8. The pinion shaft 11 is coupled to one end (axially lower end) of the intermediate shaft 9 via a universal joint 10.

The column shaft 7 includes an input shaft 7a, an output shaft 7b, and a torsion bar 7c. The input shaft 7a is coupled to the steering wheel 2. The output shaft 7b is coupled to the intermediate shaft 9. The input shaft 7a and the output shaft 7b are coaxially coupled to the torsion bar 7c. A pinion 11a is provided at an axially lower end of the pinion shaft 11. The steering mechanism 4 includes a rack shaft 12 provided with a rack 12a that meshes with the pinion 11a. The pinion 11a and the rack 12a form a rack and pinion mechanism A that is a motion converting mechanism.

When the steering shaft 6 rotates in conjunction with a driver's steering operation, the rotary motion is converted into axial reciprocating linear motion of the rack shaft 12 via the rack and pinion mechanism A. The reciprocating linear motion of the rack shaft 12 is transmitted to the turning wheels 3 via tie rods 13 coupled to both ends of the rack shaft 12. This changes the turning angles of the turning wheels 3 to change the traveling direction of the vehicle.

The assist mechanism 5 includes an electric motor 14, a worm speed reducer 15, and an electronic control unit (ECU) 16. The electric motor 14 applies an assist torque to the column shaft 7. The worm speed reducer 15 transmits rotation output from the electric motor 14 to the column shaft 7. The ECU 16 controls the operation of the electric motor 14. The worm speed reducer 15 includes a housing 17, a worm shaft 18, a worm wheel 19, and a power transmission joint 20. The worm wheel 19 meshes with the worm shaft 18. The power transmission joint 20 couples an output shaft 14a of the electric motor 14 and the worm shaft 18 together so as to enable torque to be transmitted. The worm shaft 18, the worm wheel 19, and the power transmission joint 20 are housed in the housing 17.

Rotation output from the electric motor 14 is transmitted to the column shaft 7 via the worm speed reducer 15. Thus, a motor torque is applied to the steering shaft 6 to assist the steering operation. The electric power steering system 1 is provided with a torque sensor 21. The torque sensor 21 detects a steering torque T based on the relative rotations of the input shaft 7a and output shaft 7b of the column shaft 7. The steering torque T is a torque applied to the steering shaft 6 during the driver's steering operation. The vehicle is provided with a vehicle speed sensor 22 that detects a vehicle speed V (traveling speed of the vehicle).

The ECU 16 sets a target assist torque based on the detected steering torque T and the detected vehicle speed V. The ECU 16 feedback-controls a current supplied to the electric motor 14 so that the assist torque applied to the column shaft 7 by the electric motor 14 is equal to the target assist torque. In the present embodiment, the description is based on an example where the electric power steering system 1 is of what is called a column assist type in which the electric motor 14 applies mechanical power to the column shaft 7. However, the present invention is not limited to this and is applicable to an electric power steering system of what is called a pinion assist type in which the electric motor applies mechanical power to the pinion shaft.

Figure 2:
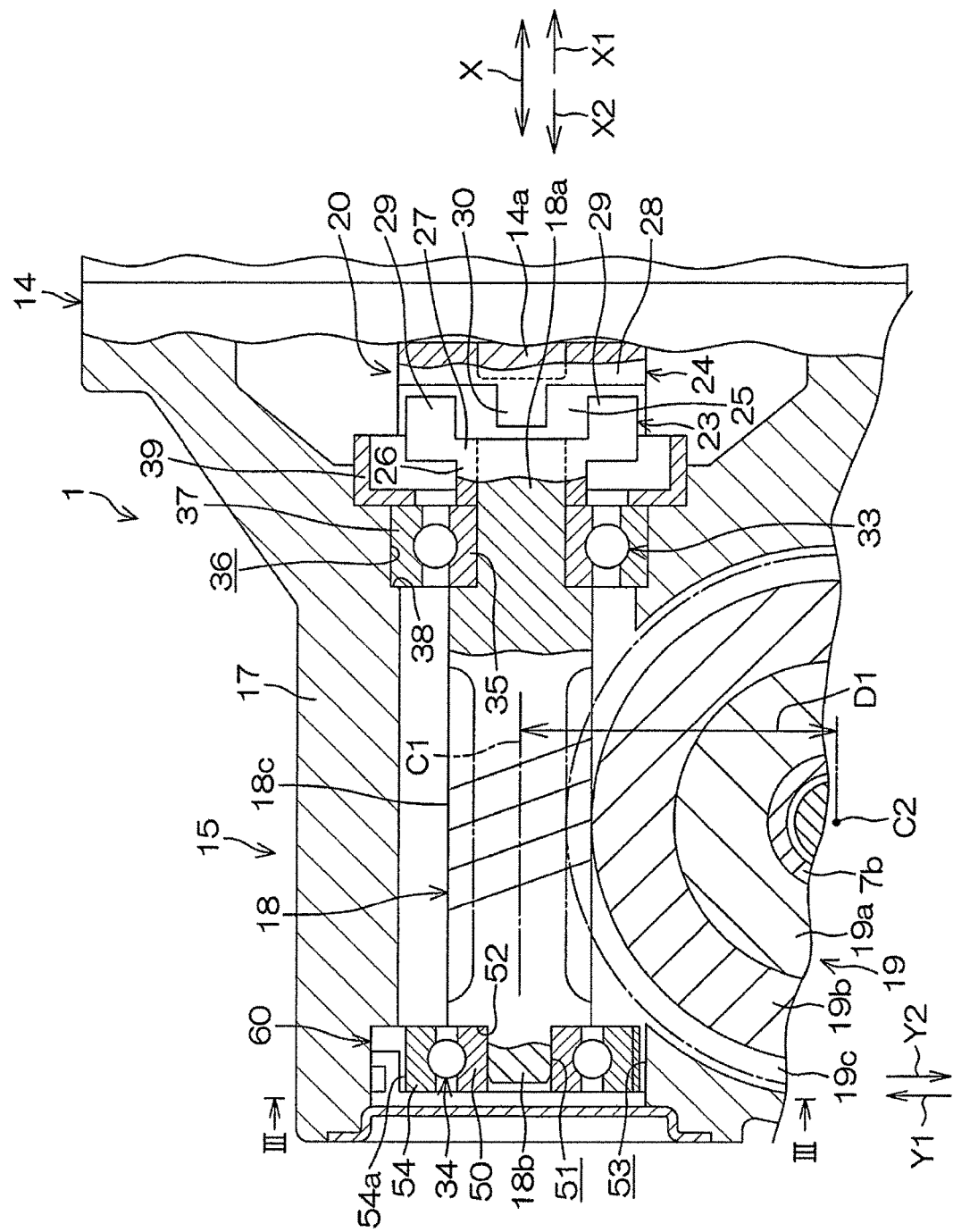
FIG. 2 is a sectional view of an important part of the electric power steering system.

As depicted in FIG. 2, the worm shaft 18 is arranged coaxially with the output shaft 14a of the electric motor 14. The output shaft 14a and the worm shaft 18 face each other in an axial direction X. That is, an end of the output shaft 14a and an end of the worm shaft 18 face each other in the axial direction X. The worm shaft 18 has a first end 18a and a second end 18b, and a tooth portion 18c. The first end 18a and the second end 18b are separate from each other in a shaft length direction. The tooth portion 18c is provided midway between the first end 18a and the second end 18b.

The worm wheel 19 is coupled to an axially intermediate portion of the output shaft 7b of the column shaft 7 so as to be rotatable integrally with the output shaft 7b and immovable in the axial direction. The worm wheel 19 includes an annular metal core 19a and a resin member 19b. The metal core 19a is linked with the output shaft 7b so as to be rotatable integrally with the output shaft 7b. The resin member 19b surrounds a periphery of the metal core 19a and has a tooth portion 19c on an outer periphery of the resin member 19b. The metal core 19a is, for example, inserted into a mold when the resin member 19b is formed by resin molding.

The first end 18a of the worm shaft 18 and the end of the output shaft 14a of the electric motor 14, which faces the first end 18a, are coupled together via the power transmission joint 20 so as to be able to transmit torque and to pivot against each other. Specifically, the power transmission joint 20 includes a first rotation element 23, a second rotation element 24, and an intermediate element 25. The first rotation element 23 is coupled to the first end 18a of the worm shaft 18 so as to be rotatable integrally with the worm shaft 18. The second rotation element 24 is coupled to the output shaft 14a of the electric motor 14 so as to be rotatable integrally with the output shaft 14a. The intermediate element 25 is interposed between the first rotation element 23 and the second rotation element 24. The intermediate element 25 includes an elastic member such as rubber that transmits torque between the rotation elements 23 and 24.

The first end 18a of the worm shaft 18 is rotatably supported by the housing 17 via a first bearing 33. The second end 18b of the worm shaft 18 is rotatably supported by the housing 17 via a second bearing 34. The elastic member of the intermediate element 25 of the power transmission joint 20 is elastically deformed to permit the worm shaft 18 to pivot against the output shaft 14a of the electric motor 14 around a bearing center of the first bearing 33.

The first bearing 33 and the second bearing 34 each include, for example, a ball bearing. The first bearing 33 includes an inner ring 35 and an outer ring 37. The inner ring 35 is fitted over the first end 18a of the worm shaft 18 so as to be rotatable integrally with the worm shaft 18. The outer ring 37 is fixed in a bearing hole 36 formed in the housing 17. The outer ring 37 is sandwiched between a positioning step portion 38 and a clamping member 39 in the axial direction. The positioning step portion 38 is provided at an end of the bearing hole 36. The clamping member 39 is threadably fitted in a threaded portion formed in the bearing hole 36. This regulates axial movement of the outer ring 37.

An inner ring 50 of the second bearing 34 is fitted in a fitting recess portion 51 formed in an outer periphery of the second end 18b of the worm shaft 18 so as to be rotatable integrally with the worm shaft 18. One end surface of the inner ring 50 is in abutting contact with a positioning step portion 52 formed on an outer periphery of the second end 18b. This regulates axial movement of the inner ring 50 with respect to the worm shaft 18. A bearing hole 53 is formed in the housing 17 to hold the second bearing 34. The bearing hole 53 is formed as a bias hole that can hold the second bearing 34 so as to be able to bias the second bearing 34 in directions Y1 and Y2 (a direction of increase Y1 and a direction of decrease Y2) in which a center distance D1 between the worm shaft 18 and the worm wheel 19 (corresponding to the distance between a central axis C1 that is the center of rotation of the worm shaft 18 and a central axis C2 that is the center of rotation of the worm wheel 19) increases and decreases.

Figure 3:
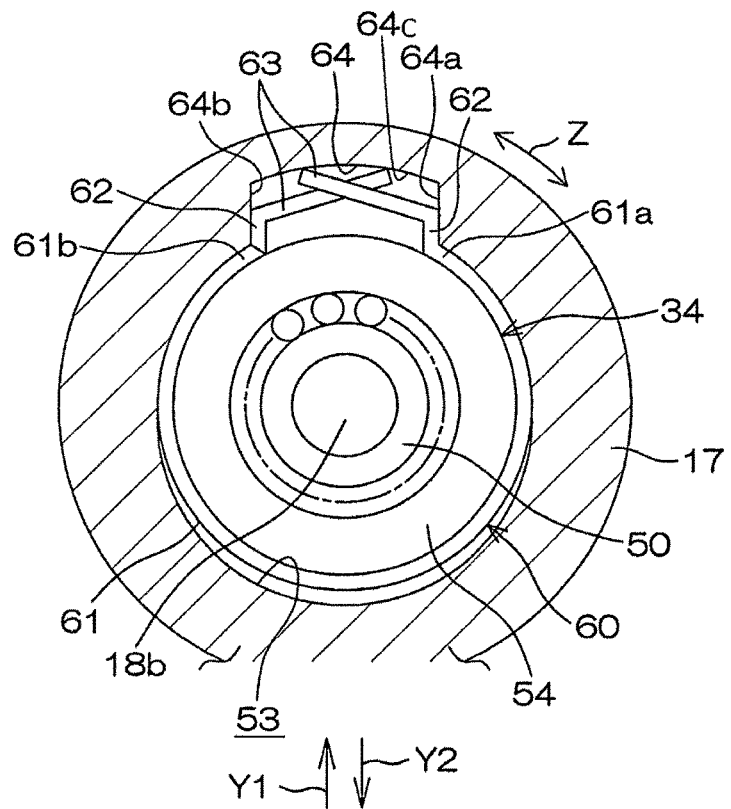
FIG. 3 is a schematic cross-sectional view taken along line in FIG. 2 and depicting a structure that supports a second end of a worm shaft.

A bias member 60 including, for example, an annular leaf spring is interposed between an inner periphery of the bearing hole 53 and an outer ring 54 of the second bearing 34. The bias member 60 biases the second bearing 34 in the direction Y2 in which the center distance D1 decreases (toward the worm wheel 19 side). The bias member 60 is a thin-plate-like member formed of, for example, sheet metal. As seen in FIG. 3 that is a cross-sectional view taken along line in FIG. 2 and FIG. 4 that is a perspective view, the bias member 60 includes a main body portion 61 that forms an ended ring, a pair of rotation regulating portions 62, and a pair of cantilevered elastic tongue pieces 63. The main body portion 61 surrounds an outer periphery 54a of the outer ring 54 of the second bearing 34. The rotation regulating portions 62 are bent at and extend from a first end 61a and a second end 61b, which are circumferential ends of the main body portion 61. The elastic tongue pieces 63 are bent at and extend from the rotation regulating portions 62.

Figure 4:
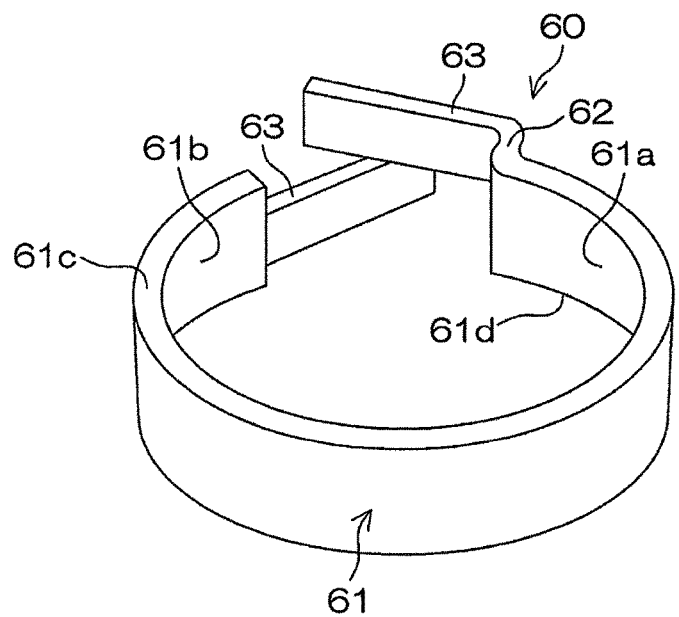
FIG. 4 is a schematic perspective view of a leaf spring serving as a bias member to eliminate backlash of the worm speed reducer.

Each of the rotation regulating portions 62 is smaller than the main body portion 61 in width. The main body portion 61 is held inside the inner periphery of the bearing hole 53 in the housing 17 through frictional engagement. As depicted in FIG. 4, one of the elastic tongue pieces 63 is arranged on a first side edge 61c side, and the other elastic tongue piece 63 is arranged on a second side edge 61d side. Thus, the elastic tongue pieces 63 are arranged in a staggered manner. As seen in FIG. 3, a receiving recess portion 64 recessed in a direction (the direction Y1 in which the center distance D1 increases) opposite to the direction toward the worm wheel 19 side (the direction Y2 in which the center distance D1 decreases) with respect to the second bearing 34 is formed in a part of the inner periphery of the bearing hole 53 in the housing 17. A tip of each of the elastic tongue pieces 63 of the bias member 60 is received by a bottom 64c of the receiving recess portion 64 of the bearing hole 53. The bias force of each of the elastic tongue pieces 63 biases the second end 18b of the worm shaft 18, via the second bearing 34, in the direction Y2 in which the center distance D1 decreases.

Figure 5:
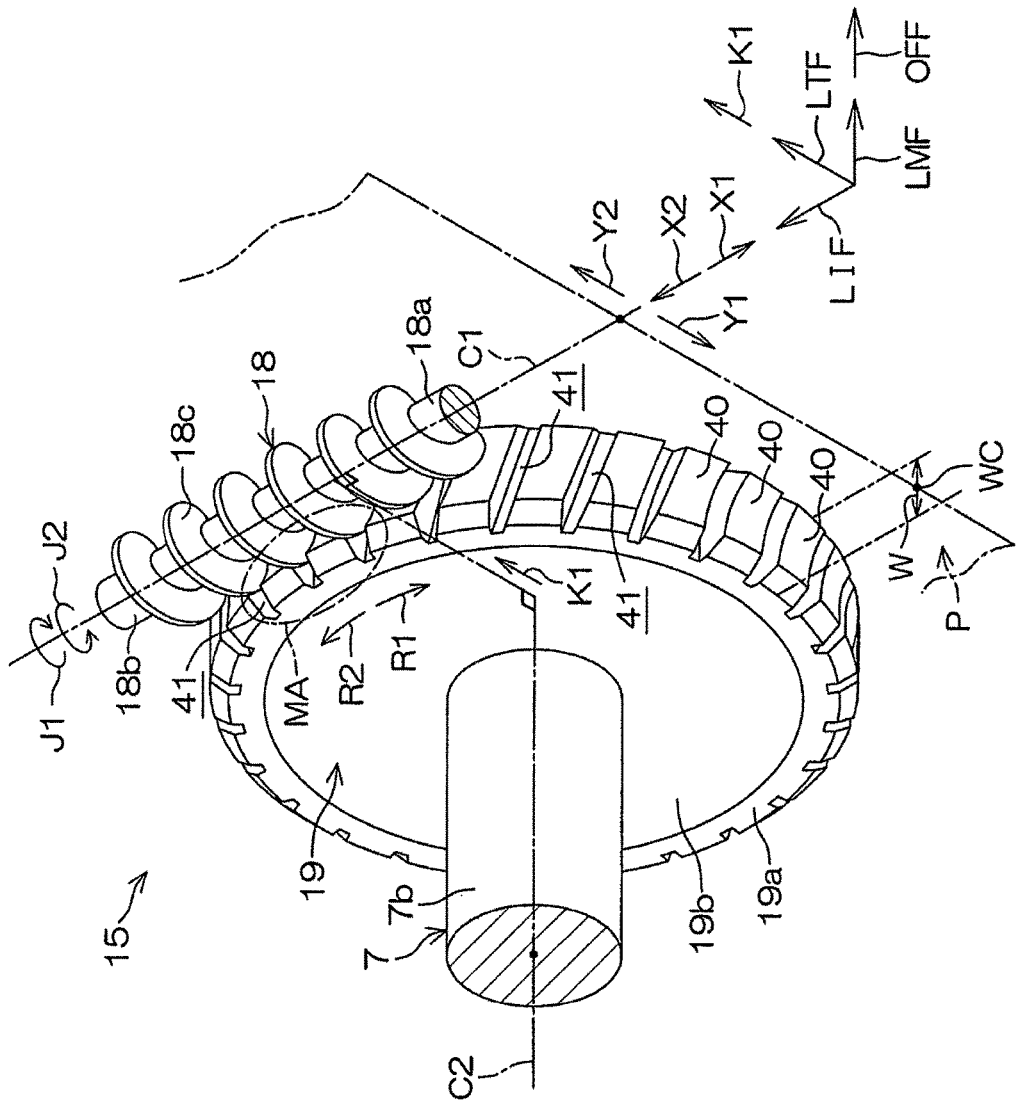
FIG. 5 is a perspective view of an important part of the worm speed reducer.
Figure 9A:
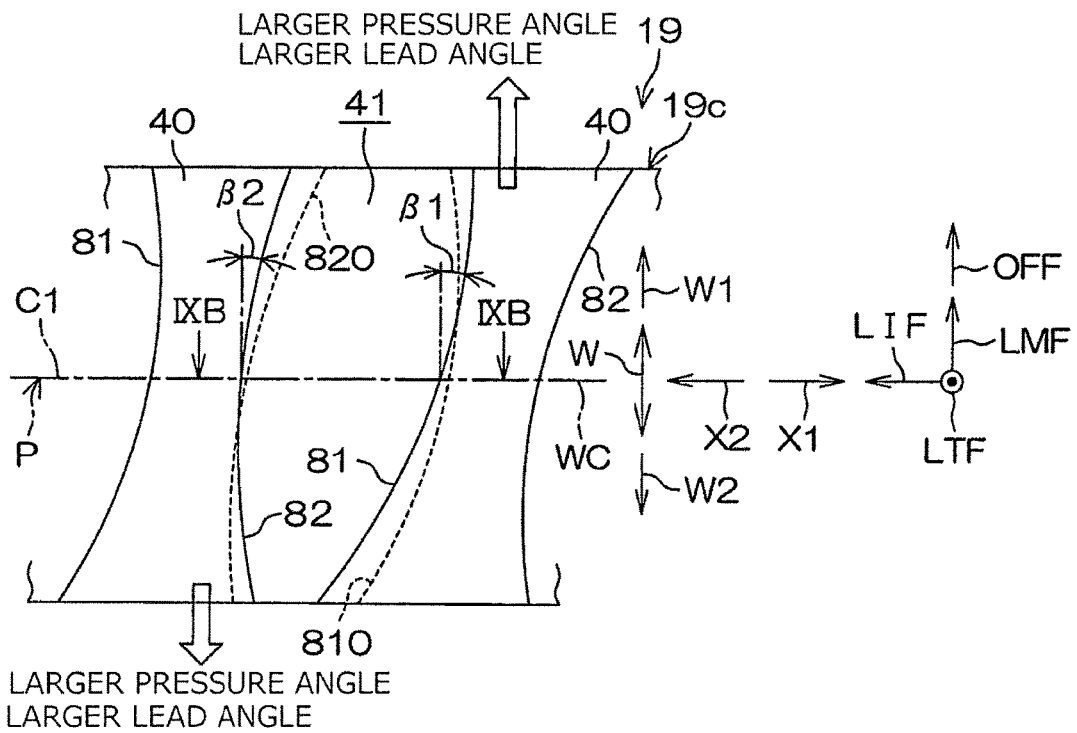
FIG. 9A is an enlarged diagram of a tooth portion of the worm wheel, corresponding to a diagram of the worm wheel as viewed from radially outside.

The receiving recess portion 64 has a pair of inner walls 64a and 64b facing each other in a circumferential direction Z of the bearing hole 53. The rotation regulating portions 62 of the bias member 60 come into abutting contact with the corresponding inner walls 64a and 64b to regulate rotation of the bias member 60 in the circumferential direction Z of the bearing hole 53. FIG. 5 is a perspective view of an important part of the worm speed reducer 15. FIG. 9A is an enlarged view of the tooth portion of the worm wheel 19. As depicted in FIG. 5 and FIG. 9A, a plane P that contains the central axis C1 of the worm shaft 18 and that is orthogonal to the central axis C2 of the worm wheel 19 is arranged at a central position WC of the worm wheel 19 in a tooth width direction W when no load is applied to the worm speed reducer 15.

Figure 6:
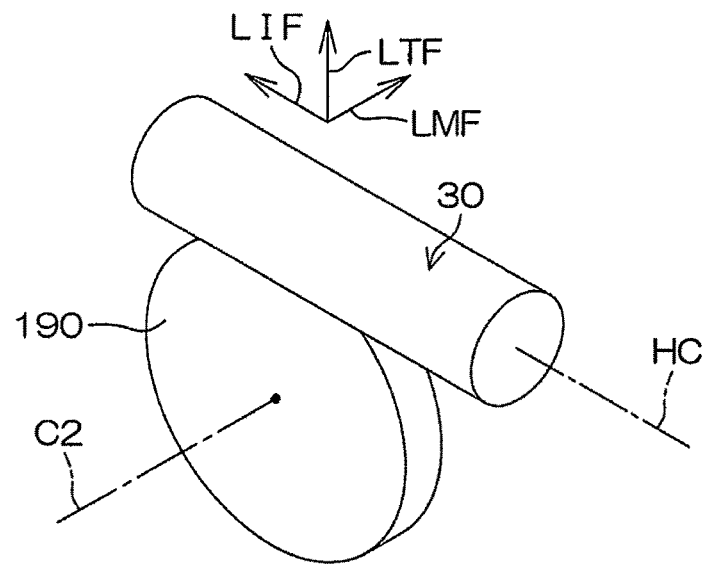
FIG. 6 is a perspective view illustrating a method for manufacturing a worm wheel using a hob.

Tooth spaces 41 are each formed between adjacent teeth 40 of the worm wheel 19. In a meshing area MA, the tooth portion 18c of the worm shaft 18 meshes with the tooth spaces 41 of the worm wheel 19. As depicted in FIG. 6, the worm wheel 19 is formed by cutting a worm wheel material 190 using a hob 30. The hob 30 that is rotated around a hob center HC and the worm wheel material 190 that is rotated around the central axis C2 are synchronously rotated.

Figure 7:
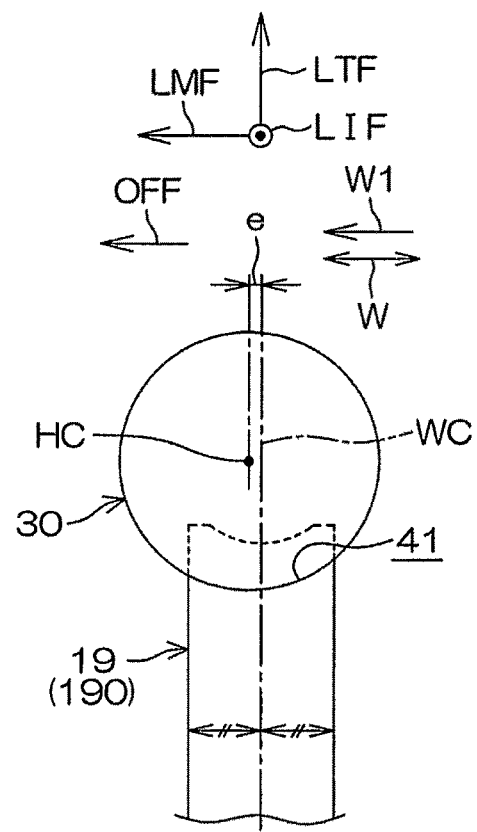
FIG. 7 is a schematic diagram illustrating a positional relationship between a worm wheel (material) and the hob.

Specifically, as depicted in FIG. 7, the worm wheel 19 is formed by a cutting operation using the hob 30 with the hob center HC offset by an offset amount (e) from the central position WC in an offset direction OFF corresponding to a first direction W1 along the tooth width direction W. As seen in FIG. 5, an axial second end side X2 of the worm shaft 18 is set to correspond to the direction of the index finger of the left hand LIF. A direction K1 that is orthogonal both to the central axis C1 of the worm shaft 18 and to the central axis C2 of the worm wheel 19 and that extends toward the central axis C1 of the worm shaft 18 is set to correspond to the direction of the thumb of the left hand LTF. In this case, the offset direction OFF of the hob center HC corresponds to the direction of the middle finger of the left hand LMF.

When the worm shaft 18, shaped like a right hand screw, is rotationally driven in a first rotating direction J1 (clockwise as viewed from the first end 18a side), the worm wheel 19 rotates in a first rotating direction R1 (clockwise). On the other hand, when the worm shaft 18 is rotationally driven in a second rotating direction J2 (counterclockwise as viewed from the first end 18a side), the worm wheel 19 rotates in a second rotating direction R2 (counterclockwise).

Figure 8:
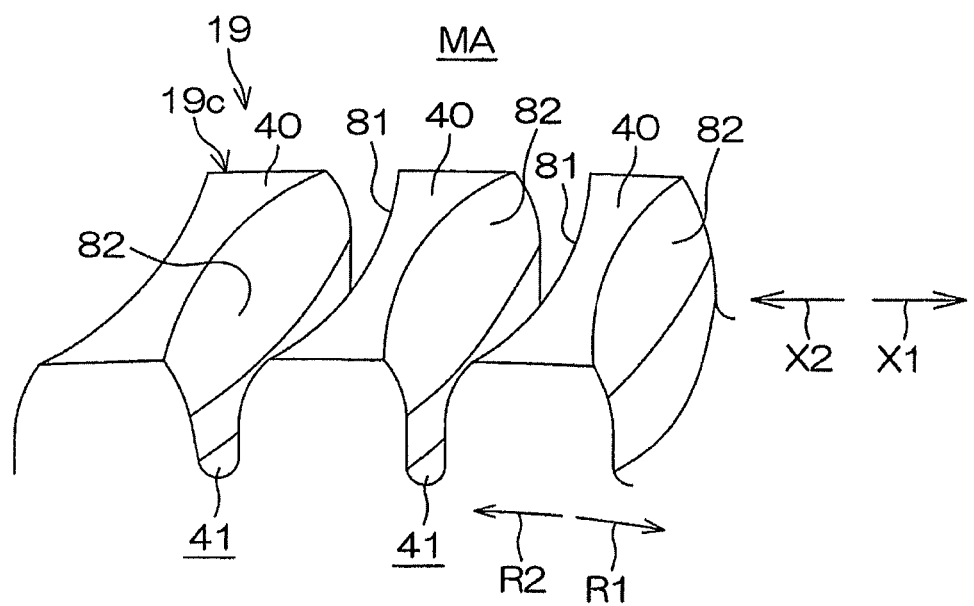
FIG. 8 is an enlarged perspective view of an important part of the worm wheel.

FIG. 8 is an enlarged view of the tooth portion 19c in the meshing area MA of the worm wheel 19. As depicted in FIG. 8, each of the tooth spaces 41 in the worm wheel 19 is defined by a first tooth flank 81 and a second tooth flank 82. In the meshing area MA, the first tooth flank 81 corresponds to a tooth flank on an axial first end side X1 of the worm shaft 18. The second tooth flank 82 corresponds to a tooth flank on the axial second end side X2 of the worm shaft 18.

FIG. 9A is an enlarged view of the tooth portion 19c of the worm wheel 19 as viewed from radially outside. In FIG. 9A, the first tooth flank 81 and the second tooth flank 82 depicted by continuous lines are tooth flanks of the worm wheel 19 formed by a cutting operation using the hob 30 (see FIG. 7) offset in the offset direction OFF (corresponding to the first direction W1 along the tooth width direction W). On the other hand, a first tooth flank 810 and a second tooth flank 820 depicted by dashed lines are tooth flanks of the worm wheel in a comparative example that are formed by a cutting operation using a non-offset hob.

As depicted by white arrows in FIG. 9A, in the first tooth flank 81, a pressure angle and a lead angle increase toward the first direction W1 (offset direction OFF) along the tooth width direction W. In contrast, in the second tooth flank 82, the pressure angle and the lead angle increase toward a second direction W2 along the tooth width direction W (the direction opposite to the offset direction OFF). The tooth form of the first tooth flank 81 at the central position WC in the tooth width direction W corresponds to the tooth form of a portion of the first tooth flank 810 in the comparative example, which is arranged at a position away from the central position WC toward the second direction W2 along the tooth width direction W (corresponding to the direction opposite to the offset direction OFF). That is, the pressure angle α1 and lead angle β1 of the first tooth flank 81 at the central position WC in the tooth width direction W are smaller than the pressure angle and the lead angle of the first tooth flank 810 in the comparative example at the central position WC in the tooth width direction W.

The tooth form of the second tooth flank 82 at the central position WC in the tooth width direction W corresponds to the tooth form of a portion of the second tooth flank 820 in the comparative example, which is arranged at a position away from the central position WC toward the second direction W2 along the tooth width direction W (corresponding to the direction opposite to the offset direction OFF). That is, the pressure angle α2 and lead angle β2 of the second tooth flank 82 at the central position WC in the tooth width direction W are larger than the pressure angle and the lead angle of the second tooth flank 820 in the comparative example at the central position WC in the tooth width direction W.

Figure 9B:
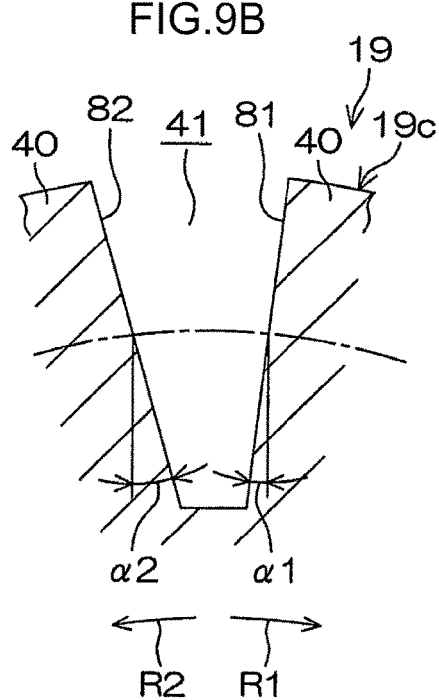
FIG. 9B is a sectional view of the tooth portion of the worm wheel, corresponding to a sectional view taken along line IXB-IXB in FIG. 9A.

FIG. 9B is a sectional view taken along line IXB-IXB in FIG. 9A. As depicted in FIG. 9B, at the central position WC in the tooth width direction W, the pressure angle α1 of the first tooth flank 81 and the pressure angle α2 of the second tooth flank 82 are different from each other. Specifically, at the central position WC in the tooth width direction W, the pressure angle α2 of the second tooth flank 82 is larger than the pressure angle α1 of the first tooth flank 81 (α1<α2).

Furthermore, as depicted in FIG. 9A, at the central position WC in the tooth width direction W, the lead angle β1 of the first tooth flank 81 and the lead angle β2 of the second tooth flank 82 are different from each other. Specifically, at the central position WC in the tooth width direction W, the lead angle β2 of the second tooth flank 82 is larger than the lead angle β1 of the first tooth flank 81 (β1<β2). As depicted in FIG. 10A, when the worm wheel 19 rotates in the first rotating direction R1 (clockwise), the second tooth flank 82, of the two tooth flanks 81 and 82, is a contact tooth flank that comes into contact with the worm shaft 18. At this time, the central axis C1 of the worm shaft 18 is tilted such that a second end side portion C1b of the central axis C1 is displaced toward the second direction W2 along the tooth width direction W (opposite to the offset direction OFF) with respect to the central position WC.

Thus, the second tooth flank 82 forms a tooth contact area HA2 where the second tooth flank 82 comes into contact with the worm shaft 18, at a position away from the central position WC toward the second direction W2 along the tooth width direction W (opposite to the offset direction OFF). The pressure angle and the lead angle in the tooth contact area HA2 of the second tooth flank 82 are larger than the pressure angle and the lead angle, respectively, in a tooth contact area (not depicted in the drawings) of the second tooth flank 820 in the comparative example. Consequently, a frictional resistance torque can be reduced, which is exerted when the second tooth flank 82 is a contact tooth flank.

On the other hand, when the worm wheel 19 rotates in the second rotating direction R2 (counterclockwise), the first tooth flank 81, of the two tooth flanks 81 and 82, is a contact tooth flank that comes into contact with the worm shaft 18, as depicted in FIG. 10B. At this time, the central axis C1 of the worm shaft 18 is tilted such that the second end side portion C1b of the central axis C1 is displaced toward the first direction W1 along the tooth width direction W (offset direction OFF) with respect to the central position WC.

Thus, the first tooth flank 81 forms a tooth contact area HA1 where the first tooth flank 81 comes into contact with the worm shaft 18, at a position away from the central position WC toward the first direction W1 along the tooth width direction (offset direction OFF). The pressure angle and the lead angle in the tooth contact area HA1 of the first tooth flank 81 are larger than the pressure angle and the lead angle, respectively, in a tooth contact area (not depicted in the drawings) of the first tooth flank 810 in the comparative example. Consequently, a frictional resistance torque can be increased which is exerted when the first tooth flank 81 is a contact tooth flank.

As described above, the frictional resistance torque is reduced, which is exerted when the second tooth flank 82 is a contact tooth flank, and the frictional resistance torque is increased, which is exerted when the first tooth flank 81 is a contact tooth flank. This suppresses a difference in frictional resistance torque due to a difference in rotating direction. The present embodiment uses hobbing with the hob center HC offset toward the first direction W1 along the tooth width direction W to set the different pressure angles α1 and α2 for the first tooth flank 81 and the second tooth flank 82, respectively, which define each of the tooth spaces 41 in the worm wheel 19. This enables a reduction in a difference in meshing reaction force depending on the rotating direction, allowing suppression of a difference in frictional resistance torque due to a difference in rotating direction. The offset amount (e) in the offset direction OFF can be changed using the common hob 30. Consequently, a plurality of worm wheels 19 with different specifications can be manufactured, allowing manufacturing costs to be reduced as much as possible.

Specifically, the axial second end side X2 of the worm shaft 18 is set to be the direction of the index finger of the left hand LIF. The direction that is orthogonal both to the central axis C1 of the worm shaft 18 and to the central axis C2 of the worm wheel 19 and that extends toward the central axis C1 of the worm shaft 18 is set to be the direction of the thumb of the left hand LTF. The direction of the middle finger of the left hand LMF is set to be the offset direction OFF. Thus, in the meshing area MA, the pressure angle α1 of the first tooth flank 81 (the tooth flank on the first end 18a side of the worm shaft 18), of the two tooth flanks 81 and 82 of the worm wheel 19, is relatively reduced at the central position WC in the tooth width direction W. The pressure angle α2 of the second tooth flank 82 (the tooth flank on the second end 18b side of the worm shaft 18) is relatively increased at the central position WC in the tooth width direction W (α1<α2). As a result, a difference in frictional resistance torque due to a difference in rotating direction can be suppressed.

Furthermore, the lead angles of the first tooth flank 81 and the second tooth flank 82 at the central position WC in the tooth width direction W are set to different values β1 and β2. This enables a reduction in a difference in meshing reaction force due to a difference in rotating direction. As a result, a difference in frictional resistance torque due to a difference in rotating direction can be more appropriately suppressed. Furthermore, in the method for manufacturing the worm wheel 19 according to the present embodiment, the hob center HC of the hob 30 is offset in the offset direction OFF, that is, toward the first direction W1 along the tooth width direction W, from the central position WC. The hob 30 is used to cut the first tooth flank 81 and the second tooth flank 82, which define the tooth space 41, such that the first tooth flank 81 and the second tooth flank 82 have the different pressure angles α1 and α2, respectively, at the central position WC in the tooth width direction W. Therefore, the offset amount (e) in the offset direction OFF can be changed using the common hob 30. Thus, a plurality of worm wheels 19 with different specifications for the pressure angle can be manufactured, allowing the manufacturing costs to be reduced as much as possible.

Furthermore, the offset amount (e) in the offset direction OFF is changed using the common hob 30. Thus, a plurality of worm wheels 19 with different specifications for the lead angle can be manufactured. As a result, the manufacturing costs can be reduced as much as possible. The present invention is not limited to the above-described embodiment. Various changes may be made to the embodiment within the scope of the present invention.

What is claimed is:

1. A worm speed reducer comprising:
   a worm shaft with a first end coupled to an electric motor so as to be driven by the electric motor and a second end on the opposite side of the worm shaft in its axial direction from the first end;
   a worm wheel with pairs of tooth flanks, each pair defining a tooth space;
   a housing that houses the worm shaft and the worm wheel and that supports the second end of the worm shaft so as to enable the second end to pivot around the first end; and
   a bias member supported by the housing to elastically bias the second end of the worm shaft toward the worm wheel side, wherein
   a plane that contains a central axis of the worm shaft and that is orthogonal to the central axis of the worm wheel is arranged at a central position of the worm wheel in a tooth width direction thereof,
   the worm wheel is formed by a cutting operation using a hob with a hob center offset from the central position in the tooth width direction, in an offset direction corresponding to a first direction along the tooth width direction, and the tooth flanks of each pair have different pressure angles at the central position in the tooth width direction, and in the worm wheel, the tooth flanks of each pair have different lead angles at the central position in the tooth width direction.

2. The worm speed reducer according to claim 1, wherein when (i) an axial second end side of the worm shaft is set to correspond to an x-axis of a Cartesian coordinate system, and (ii) a direction that is orthogonal both to a central axis of the worm shaft and to a central axis of the worm wheel and that extends toward the central axis of the worm shaft is set to correspond to y-axis of the Cartesian coordinate system, the offset direction corresponds to a z-axis of the Cartesian coordinate system.

3. A method for manufacturing a worm wheel included in the worm speed reducer according to claim 1, the method comprising:
   cutting a worm wheel material using a hob with a hob center offset from a central position in a tooth width direction, in an offset direction corresponding to a first direction along the tooth width direction, to form pairs of tooth flanks, each pair defining a tooth space, such that the tooth flanks of each pair have different pressure angles at the central position in the tooth width direction.

4. A method for manufacturing a worm wheel included in the worm speed reducer according to claim 2, the method comprising:
   cutting a worm wheel material using a hob with a hob center offset from a central position in a tooth width direction, in an offset direction corresponding to a first direction along the tooth width direction, to form pairs of tooth flanks, each pair defining a tooth space, such that the tooth flanks of each pair have different pressure angles at the central position in the tooth width direction.

5. The method according to claim 3, wherein
   during the cutting, the tooth flanks of each pair are cut such that the tooth flanks have different lead angles at the central position in the tooth width direction.

6. The method according to claim 4, wherein
   during the cutting, the tooth flanks of each pair are cut such that the tooth flanks have different lead angles at the central position in the tooth width direction.

* * * * *